May 7, 1940.   L. E. WILSON ET AL   2,199,684
TRACTOR ATTACHMENT FOR AUTOMOBILES
Filed March 1, 1939
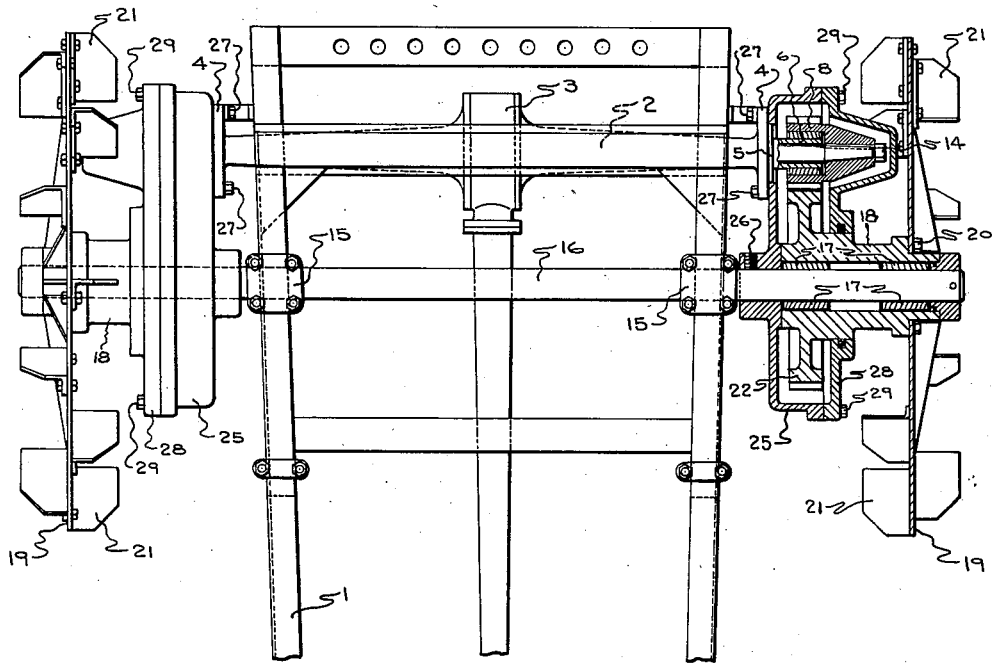
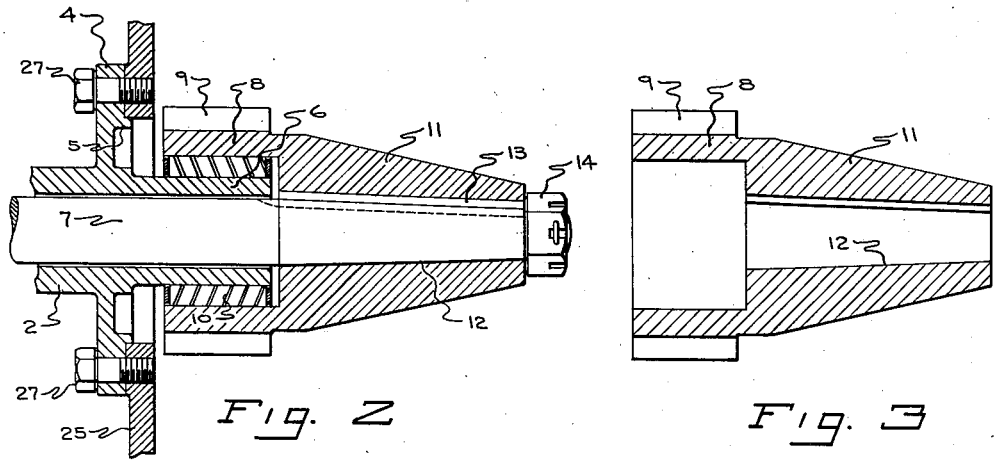
Inventors
LUCIUS E. WILSON, AND
EARL E. BAUGHN
By Beaman & Langford
Attorneys Patented May 7, 1940

2,199,684

UNITED STATES PATENT OFFICE 2,199,684

TRACTOR ATTACHMENT FOR AUTOMOBILES

Lucius E. Wilson and Earl E. Baughn, Pinckney, Mich.

Application March 1, 1939, Serial No. 259,127

9 Claims. (Cl. 180—16)

This invention relates to tractors and more particularly to farm tractors constructed from old automobiles.

In constructing tractors from old automobiles, it is usual to provide tractor wheels on specially provided axles, the wheels being driven by gear trains connected to the conventional axle. In such constructions driving pinions are usually supported from the outer ends of the rear axle of the automobile. However, the usage to which tractors are put is so severe that the driving pinions yield slightly, resulting in excessive wear on the meshing gear teeth. The present invention comprises an improvement over the prior art in that the driving pinions are journaled to members rigid with respect to the frame of the automobile, with the result that there are provided non-yielding pinions, which under the most severe uses to which a tractor may be put properly mesh with their associated gears, whereby excessive wearing of the gear teeth is eliminated. An example of the earlier forms of conversion tractors, over which the present invention is an improvement, is disclosed in Patent No. 1,972,694, to E. G. Staude.

An object of the invention is to provide a conversion tractor wherein the driving pinions from the rear axle are rigidly supported with respect to the frame.

Another object of the invention is to provide a conversion tractor wherein the driving connection between the rear axle and a ground wheel is a completely enclosed gear train.

A still further object of the invention is to provide a conversion tractor wherein the driving pinions are journaled on portions of the rear axle housing, which is rigidly supported with respect to the frame.

These and other objects will be apparent from the following specification when taken with the accompanying drawing, in which:

Fig. 1 is a partial plan view of the chassis of a conversion tractor showing the driving connection for one wheel and one wheel in section, Fig. 2 is a section of a detail, and Fig. 3 is a section of a driving pinion.

Referring particularly to the drawing, the reference character 1 indicates an auxiliary frame suitably and rigidly secured to the automobile chassis, which preferably is a Ford Model A. To the auxiliary frame 1 is rigidly secured in some suitable manner the rear axle housing 2, which is provided with the differential 3. At each end of the rear axle of the housing 2 is a radially extending flange 4. Each flange 4 is provided with an outwardly projecting annular ring 5, shown particularly in Figs. 1 and 2. Integral with the axle housing 2 and at each end thereof are outwardly projecting sleeves 6. Disposed within and projecting through the axle housing 2 is an axle 7. The structure thus far described, with the exception of the frame, all will be found on the Ford Model A automobile.

At each end of the axle 7 there are provided driving pinions 8 having teeth 9. The pinions 8 are rotatably mounted on the sleeves 6, roller bearings 10 being provided in a conventional manner. Each pinion 8 is provided with an extension 11 having a bore 12 therethrough for receiving an outer end of the axle 7. The extensions 11 are secured to the ends of the axle 7 by keys 13 and restrained against removal by nuts 14. It will be understood that the nuts also retain the pinions 8 on the sleeves 6.

As the sleeves 6 are rigidly connected to the frame 1, the pinions 8 are unyieldingly mounted with respect to the frame 1 and resist any thrust to which they are subject during operation. The provision of the extensions 11 on the pinions 8 makes possible a driving connection between the axle 7 and the pinions 8 by using the conventional axle and axle housing structure with which the automobile to be converted is originally equipped.

Rigidly connected to the frame 1 by brackets 15 or some equivalent is a shaft 16 on the outer ends of which are journaled, by means of roller bearings 17, hubs 18. The hubs 18 have connected thereto tractor wheels 19 by means of cap screws 20. The wheels 19 are equipped with driving lugs 21. The hubs 18 also have connected thereto gears 22, which are arranged for meshing engagement with the pinions 8. Thus, upon rotation of the axle 7, the pinions 8 are driven through the connections provided by the extensions 11, and through the pinions 8 the gears 22 are driven to rotate the hubs 18 and thus the wheels 19 to drive the tractor.

In order to maintain the pinions 8 and gear 22 free from dirt, they are covered with housings, which consist of members 25 secured to the shaft 16 by set screws 26 and to the flanges 4 by cap screws 27, and members 28, which are secured to the members 25 by cap screws 29. It will be observed that the members 25 are provided with openings to permit them to pass over the sleeves 6 and that the openings telescope with the rings 5. It will be understood that the housings consisting of the members 25 and 28 may be employed for the purpose of retaining grease as well as keeping out dirt and sand.

From the foregoing specification it will be clear that any driving thrust exerted by the gears 22 against the pinions 8 will be absorbed by the sleeves 6 and through them and the frame 1 by the chassis, with the result that there is no relative movement between the axes of the pinions 8 and the gears 22, and consequently no excessive wearing action on their teeth. While the invention has been explained as particularly applicable to Ford Model A automobiles, it will be understood that this is solely because such automobiles are originally provided with the sleeves 6 rigid with the rear axle housing, on which the driving pinions may be journaled. However, it will be understood that other types of automobiles may be equipped with the equivalents of sleeves 6, which are rigid with the frame 1 or the chassis. It will be understood also that the auxiliary frame 1 may be dispensed with and the housing 2 and shaft 16 secured rigidly directly to the usual automobile chassis.

Having thus described our invention, what we thus desire to secure by Letters Patent and claim is:

1. In combination with a frame, a driven axle, and a housing for a portion of said axle, having a cylindrical surface concentric with said axle, a pinion journaled on said cylindrical surface and in radial alignment therewith, a driving connection between said axle and said pinion, a wheel rotatably mounted with respect to said frame, and a driving connection between said wheel and said pinion.

2. In an automobile having a frame, a driven rear axle, a housing adjacent each end of said axle, each housing having a cylindrical surface concentric with said axle, a pinion journaled on each cylindrical surface and in radial alignment therewith, driven connections between said pinions and the ends of said axle, wheels rotatably mounted with respect to said frame, and driving connections between said wheels and said pinions.

3. In combination with a frame, a driven axle, and a housing for a portion of said axle, having a cylindrical surface concentric with said axle, a pinion journaled on said cylindrical surface and in radial alignment therewith, said axle projecting outwardly beyond said housing, said pinion having an integral extension concentric with the projecting portion of said axle and connected thereto, providing a driving connection between said axle and said pinion, a wheel rotatably mounted with respect to said frame, and a driving connection between said wheel and said pinion.

4. In combination with a frame, a driven axle, and a housing for said axle, said housing having end portions concentric with said axle, said end portions having concentric cylindrical exterior surfaces, a pinion journaled on each cylindrical surface and in radial alignment therewith, a driving connection between said axle and said pinions, wheels rotatably mounted with respect to said frame, and a driving connection between said wheels and said pinions.

5. In combination with a frame, a driven axle, and a housing for said axle, said housing having end portions concentric with said axle, said end portions having concentric cylindrical exterior surfaces, a pinion journaled on each cylindrical surface and in radial alignment therewith, said axle having end portions extending from said concentric portions, each of said pinions having integral extensions in telescoping relation with said axle extensions, respectively, and connected thereto to provide a driving connection between said axle and said pinions, a shaft fixed with respect to said frame, wheels mounted on said shaft, and driving connections between said wheels and said pinions.

6. In combination with a frame, a driven axle, and a housing for a portion of said axle, having a cylindrical surface concentric with said axle, a pinion journaled on said cylindrical surface and in radial alignment therewith, a driving connection between said axle and said pinion, a shaft connected to said frame, a wheel journaled on said shaft, and a driving connection between said wheel and said pinion.

7. In combination with a frame, a driven axle, and a housing for a portion of said axle, having a cylindrical surface concentric with said axle, a pinion journaled on said cylindrical surface and in radial alignment therewith, a driving connection between said axle and said pinion, a shaft connected to said frame, a hub journaled on said shaft, a wheel connected to said hub, and a gear connected to said hub, said gear meshing with said pinion for driving said wheel from said axle.

8. In an automobile having a frame, a driven rear axle, and housing for said axle adjacent each end portion thereof, said housings each having cylindrical surfaces concentric with said axle, a pinion journaled on each cylindrical surface and in radial alignment therewith, each end portion of said axle projecting beyond said housings, said pinions having integral extensions concentric with said projecting axles and connected thereto to provide driving connections between said axle and pinions, a shaft connected to said frame, hubs journaled on the outer ends of said shaft, wheels connected to said hubs, and gears connected to said hubs, said gears meshing with said pinions to drive said wheels from said axle.

9. A driving pinion for conversion tractors, comprising a pinion portion having an enlarged bore, an integral extension portion disposed axially of said pinion portion and having a bore of a lesser diameter, and a key-way in said last bore for keying said pinion to a driven axle, the enlarged bore of said pinion portion being adapted to receive a bearing in supporting relation so as to dispose the pinion portion in the same radial plane as the bearing.

LUCIUS E. WILSON.
EARL E. BAUGHN.